United States Patent
Wunderlich

(10) Patent No.: US 8,152,455 B2
(45) Date of Patent: Apr. 10, 2012

(54) SUSPENSION ARRANGEMENT FOR THE CASING SHROUD SEGMENTS

(75) Inventor: Thomas Wunderlich, Rangsdorf (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 876 days.

(21) Appl. No.: 12/216,459

(22) Filed: Jul. 3, 2008

(65) Prior Publication Data
US 2009/0010758 A1 Jan. 8, 2009

(30) Foreign Application Priority Data
Jul. 6, 2007 (DE) .......................... 10 2007 031 711

(51) Int. Cl.
*F01D 5/20* (2006.01)
*F01D 11/08* (2006.01)
(52) U.S. Cl. ................. 415/173.1; 415/214.1; 415/173.6
(58) Field of Classification Search ............... 415/173.1, 415/214.1, 173.2, 173.3, 174.2, 173.6; 277/546, 277/548, 549
See application file for complete search history.

(56) References Cited

U.S. PATENT DOCUMENTS

| | | | |
|---|---|---|---|
| 3,603,599 A | 9/1971 | Laird | |
| 5,044,881 A | 9/1991 | Dodd et al. | |
| 5,333,995 A * | 8/1994 | Jacobs et al. | 415/209.2 |
| 6,062,813 A * | 5/2000 | Halliwell et al. | 415/174.5 |
| 6,602,050 B1 | 8/2003 | Scheurlen et al. | |
| 7,334,980 B2 | 2/2008 | Trinks et al. | |
| 2005/0254939 A1 | 11/2005 | Wunderlich et al. | |
| 2006/0159549 A1 * | 7/2006 | Durocher et al. | 415/170.1 |
| 2006/0216146 A1 | 9/2006 | Thompson et al. | |
| 2008/0260524 A1 | 10/2008 | Khanin et al. | |

FOREIGN PATENT DOCUMENTS

| | | |
|---|---|---|
| DE | 3941174 | 7/1990 |
| DE | 102004016222 | 10/2005 |
| DE | 102005013798 | 9/2006 |
| EP | 0770761 | 5/1997 |
| EP | 0844369 | 5/1998 |
| EP | 1707749 | 10/2006 |
| WO | 9930009 | 6/1999 |
| WO | 00/57033 | 9/2000 |

OTHER PUBLICATIONS

European Search Report dated Aug. 1, 2011 for corresponding European patent application.

* cited by examiner

*Primary Examiner* — Caridad Everhart
(74) *Attorney, Agent, or Firm* — Timothy J. Klima; Shuttleworth & Ingersoll, PLC

(57) ABSTRACT

A suspension arrangement for the casing shroud segments of the high-pressure turbine of a jet engine with inclination or graduation of the rotor blade tips (4) includes spaced apart attaching hooks (11) formed onto the casing shroud segments (2) which engage an axial retaining groove (13) on the turbine casing (1) on the upstream side and which are axially retained in the downstream direction by a retaining ring (14) arranged in a retaining ring groove (15) formed onto the turbine casing. In the retaining ring groove (15), assembly pockets (19) are provided on the downstream side, with the assembly pockets (19) agreeing with the distance and dimensioning of the attaching hooks (11), so that—with the rotor installed—axial travel (s2) of the casing shroud segments (2) is reduced and handling clearance is increased, when the casing shroud segments (2) are installed.

16 Claims, 2 Drawing Sheets

SUSPENSION ARRANGEMENT FOR THE CASING SHROUD SEGMENTS

Figure 1:
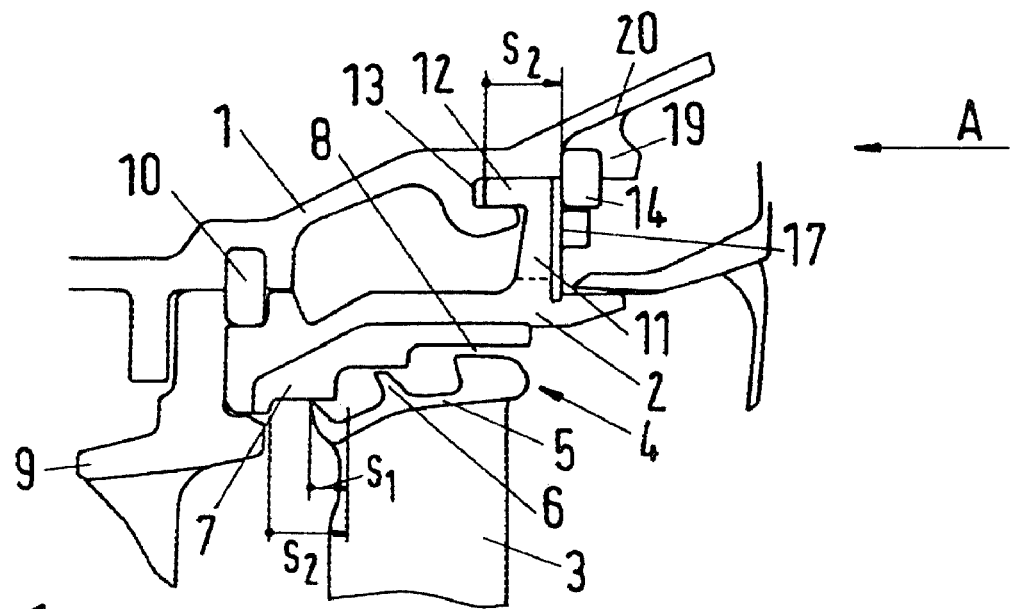

This application claims priority to German Patent Application DE102007031711.7 filed Jul. 6, 2007, the entirety of which is incorporated by reference herein.

This invention relates to a suspension arrangement for the casing shroud segments of the high-pressure turbine of a jet engine with downstream inclination or gradation of the blade tips of the rotor and of the shroud segments associated with the turbine casing.

It is generally known that aircraft gas turbines are provided in the area of the high-pressure turbine with shroud segments disposed on the turbine casing opposite of the rotor blade tips, with these shroud segments serving both as sealing elements to minimize the gap required beyond the rotor blade tips and as heat shielding. In a known design, the casing shroud segments are provided, at the downstream end, with upstream attaching hooks engaging a circumferential axial retaining groove and being secured by a retaining ring arranged in a radial ring groove. While the axial travel available in the case of shroudless rotor blades whose blade tips are concentric to their rotary axis is sufficient to allow the casing shroud segments to be relatively easily assembled and disassembled, assembly and disassembly of the casing shroud segments, accomplished from the rear of the engine, is problematic with rotor blades, shroudless or also shrouded with sealing fins, whose blade tips are non-concentric, but inclined or gradated relative to the rotary axis, in view of the large axial and radial handling clearance here required and the small gap widths or even the formation of a running-in profile in the casing shroud segment. Since the required handling clearance is available only on the upstream end, not on the downstream end of the casing shrouds, the downstream end cannot be retained directly on the turbine casing, but requires interposition of additional items and existing other turbine components. However, the long and complex tolerance chain and the thermal effects resulting therefrom are detrimental to the formation of the tip gap and, thus, the efficiency of the high-pressure turbine. Furthermore, additional components and the resultant, unavoidable increase in the size of the high-pressure turbine in this area incur higher weight and cost.

In a broad aspect, the present invention provides for a suspension arrangement for the casing shroud segments in the area of the turbine which enables them to be attached directly on the turbine casing and with minimum gap width relative to the rotor blade tips, while providing handling clearance for the assembly of the casing shroud segments with the rotor blades installed.

In essence, the present invention provides for regularly spaced assembly pockets in a radial retaining ring groove provided downstream directly on the turbine casing for a retaining ring which axially locates the casing shroud segments, with the distance and the size of the pockets agreeing with the arrangement and dimensioning of spaced apart attaching hooks provided on the casing shroud segment and engageable in an axial retaining groove formed directly onto the turbine casing. The necessary axial travel required for the assembly of the casing shroud segments in the case of inclined or gradated blade tips of the installed rotors is reduced and more clearance is available for handling the casing shroud segments during assembly. Besides reduced cost and weight, this permits smaller gap widths and, thus, increased efficiency of the turbine to be obtained.

The assembly pockets provided downstream in the retaining ring groove may extend up to the inner surface of the turbine casing, so that large handling clearance is available and a corresponding reduction in weight is obtained.

The pocket run-out edge of the assembly pockets terminates in the horizontal, central area of the retaining ring groove, thereby forming a sealing edge with the retaining ring to maintain the pressure difference, P1>P2, before and behind the casing shroud segments.

In the upstream direction, the assembly pockets may run out also on the leading edge of the retaining ring groove. Since no circumferential sealing edge with the retaining ring is created in this case, provision is made for a circumferential sealing element.

Figure 2:
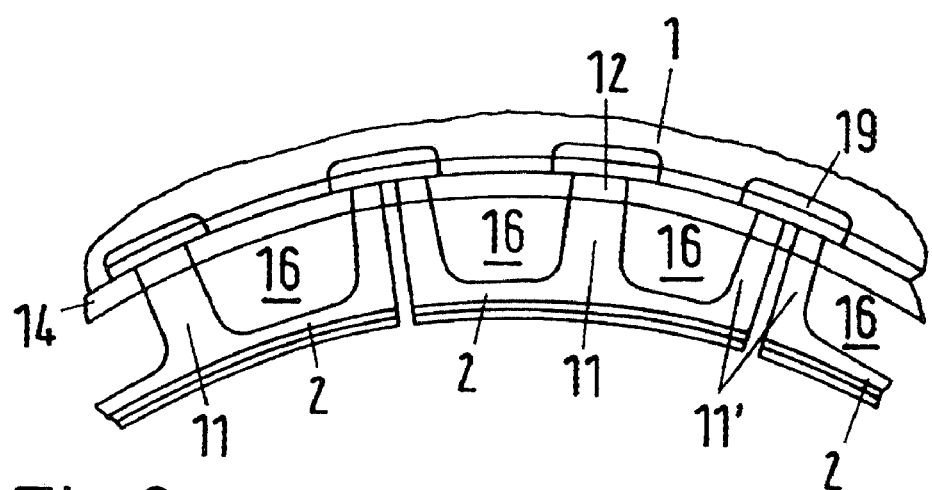
Figure 3:
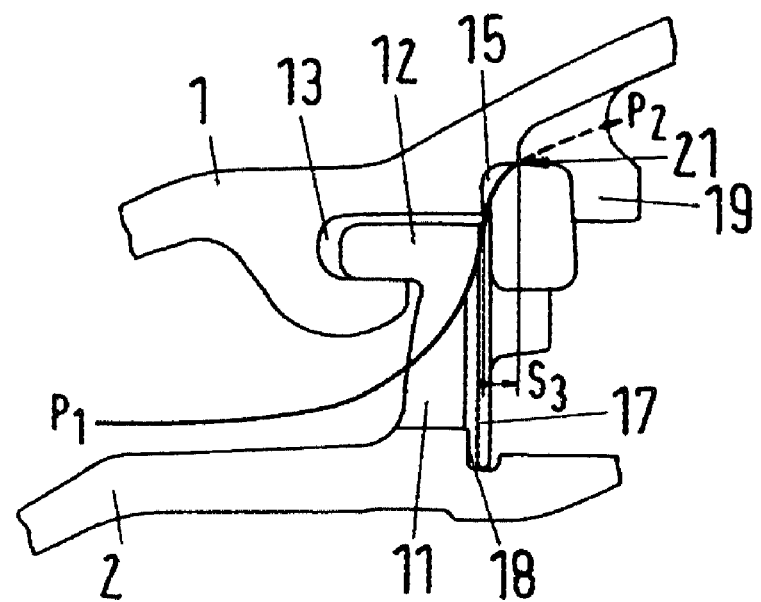
Figure 4:
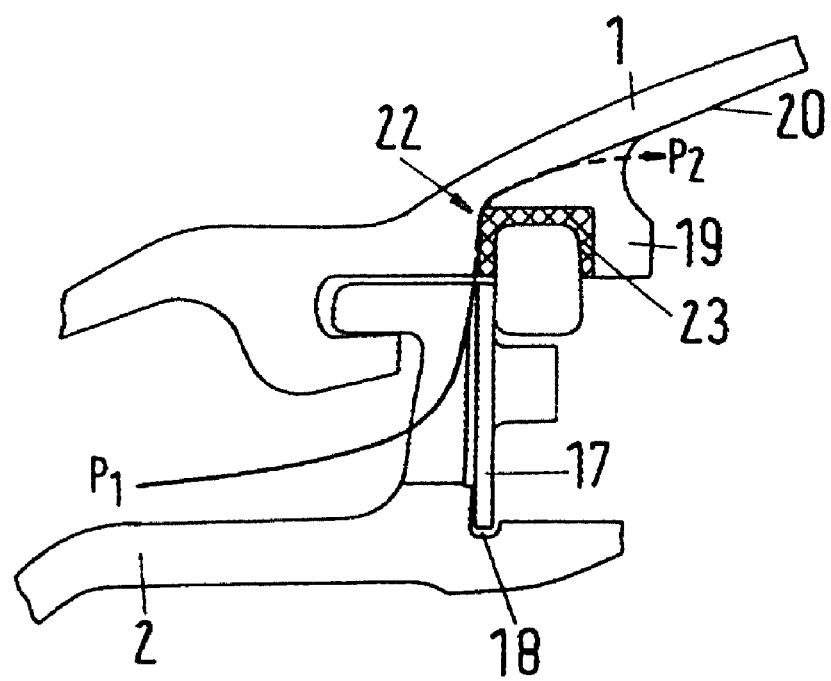

The present invention is more fully described in the light of the accompanying drawings showing a preferred embodiment. In the drawings, FIG. 1 is a sectional view of a suspension arrangement for the casing shroud segments in the area of the high-pressure turbine of a jet engine, FIG. 2 is a partial view of the suspension arrangement for the casing shroud segments in accordance with FIG. 1 in the direction of arrowhead A, however without showing a sealing plate, FIG. 3 is an enlarged sectional representation of the downstream area of the suspension arrangement for the casing shroud segments, and FIG. 4 is a sectional view as per FIG. 3, however without showing a sealing edge and with additional sealing of the downstream retaining ring for the casing shroud segment.

FIG. 1 shows a casing shroud segment 2 which is directly held on the turbine casing 1 and disposed beyond the rotor blades 3 of the high-pressure turbine of a jet engine. The inclined (gradated) rotor blade tips 4 are designed as blade shrouds 5 with sealing fins 6 forming a narrow sealing gap 8 with the mating, gradated sealing surface 7 of the casing shroud segment 2. The casing shroud segment 2 locates upstream against the turbine casing 1 and a stator vane segment 9 and is associated with a second retaining ring 10. In the downstream direction, spaced apart attaching hooks 11, 11' are formed onto the casing shroud segment 2 whose legs 12, which are angled against the direction of flow, engages a circumferential axial retaining groove 13 formed directly onto the turbine casing 1. The casing shroud segments 2 adjacently arranged on the inner circumference of the turbine casing 1 are secured, in the downstream direction, by a first retaining ring 14 disposed in a radial retaining ring groove 15 formed onto the turbine casing 1. For sealing the openings 16 remaining free between the spaced apart attaching hooks 11, a sealing plate 17 is provided which is held by the first retaining ring 14 and a groove 18 provided in the casing shroud segments 2. The retaining ring groove 15 (FIG. 3) provided in the turbine casing 1 for the first retaining ring 14 is, on the downstream side, provided with break-throughs or assembly pockets 19 which extend up to the inner surface of the turbine casing 1 and whose width exceeds that of the attaching hooks 11 or adjacent attaching hooks 11', respectively, of adjacent casing shroud segments 2. Since the individual casing shroud segments 2 are each retained by the spaced apart attaching hooks 11/11' formed thereon and the breakthroughs serving as assembly pockets 19 are equally spaced in the retaining ring groove 15, the handling clearance required for assembly and disassembly of the casing shroud segments 2 is also available in the case of installed rotor blades 3 with inclined, or gradated, rotor blade tips 4 with a small tip gap width and correspondingly high turbine efficiency.

For the assembly of the casing shroud segments 2, the rotor with the rotor blades 3 is displaced by the travel s1 into a maximum rearward position. In this rearwardly displaced position of the rotor, the casing shroud segments 2 need only be moved axially by the travel s2. On account of the spaced apart attaching hooks 11, 11' and the assembly pockets 19 provided in correspondence with the hook distance and the hook width, this relatively short travel s2 of the casing shroud segments 2 is however sufficient to enable the attaching hooks 11, 11' to be disengaged from the axial retaining groove 13. For further disassembly, the space provided by the assembly pockets 19 is sufficient to enable the casing shroud segments 2 to be gradually moved both radially and also further axially and to be fully removed. The radial extension of the assembly pockets 19 depends on the inclination, or the radial gradation of the casing shroud segment or the rotor blade shroud 5 and the sealing fins 6, respectively, and may reach up to the inner contour of the turbine casing 1 to obtain maximum weight saving in this area.

Pressure P1 upstream of the sealing plate 17 is higher than pressure P2 downstream of it. In order to prevent an additional leakage path from being released by the assembly pockets 19 in the case of rearward loading of the casing shroud segments 2, a forward pocket run-out edge 21 of turbine casing 1 (FIG. 3) terminates in the horizontal (central) area of the retaining ring groove 15, thereby producing a line contact between retaining ring 14 and turbine casing 1 to safely seal the leakage path and maintain the pressure difference P1>P2. This involves, however, that the possible travel s2 is minimally reduced by the amount s3. If the assembly pocket 19 runs out at the leading edge 22 of the retaining ring groove 15, the required travel s2 of the casing shroud segment 2 will not be reduced by the amount s3, but an annular sealing element 23 would in this case have to be provided in the retaining ring groove 15 to seal the leakage path and maintain the pressure difference P1>P2 (FIG. 4).

LIST OF REFERENCE NUMERALS

| | |
|---|---|
| 1 | Turbine casing |
| 2 | Casing shroud segment |
| 3 | Rotor blades |
| 4 | Rotor blade tips |
| 5 | Blade shroud |
| 6 | Sealing fins of 5 |
| 7 | Gradated sealing surface |
| 8 | Sealing gap |
| 9 | Stator vane segment |
| 10 | Second retaining ring |
| 11, 11' | Attaching hooks |
| 12 | Legs of 11, 11' |
| 13 | Axial retaining groove for 11, 11', 12 |
| 14 | First retaining ring |
| 15 | Radial retaining ring groove for 14 |
| 16 | Openings between 11 |
| 17 | Sealing plate |
| 18 | Groove for 17 |
| 19 | Assembly pockets (breakthroughs in 15) |
| 20 | Inner contour of turbine casing 1 |
| 21 | Pocket run-out edge |
| 22 | Leading edge of 15 |
| 23 | Annular sealing element |
| S1 | Travel of rotor |
| S2 | Axial travel of casing shroud segment 2 |
| S3 | Reduction of travel of casing shroud segment 2 |

What is claimed is:

1. A suspension arrangement for casing shroud segments of a high-pressure turbine of a jet engine having downstream inclination/gradation of rotor blade tips and casing shroud segments, comprising:

a turbine casing including an axial retaining groove, a radial retaining ring groove and a plurality of circumferentially spaced assembly pockets axially opening the axial retaining ring groove;

a plurality of casing shroud segments with downstream ends including circumferentially spaced apart attaching hooks having legs which extend axially in an upstream direction for engaging the axial retaining groove via corresponding ones of the assembly pockets;

a first retaining ring for engaging the radial retaining ring groove to axially retain the attaching hooks in the axial retaining groove;

a pocket run-out edge positioned in the retaining ring groove for engaging the retaining ring and forming a circumferential sealing edge for the retaining ring.

2. The suspension arrangement of claim 1, and further comprising at least one sealing plate for positioning between the casing shroud segments and the first retaining ring to axially seal the casing shroud segments.

3. The suspension arrangement of claim 1, wherein the assembly pockets extend into an inner contour of the turbine casing to obtain additional handling clearance.

4. The suspension arrangement of claim 3, and further comprising an annular sealing element positioned in the retaining ring groove to seal between the retaining ring groove and the retaining ring.

5. The suspension arrangement of claim 4, wherein the turbine casing includes a further radial retaining ring groove positioned upstream of the casing shroud segments for retaining a second retaining ring, and the casing shroud segments position against upstream stator vane segments, the turbine casing and the second retaining ring.

6. The suspension arrangement of claim 5, and further comprising at least one sealing plate for positioning between the casing shroud segments and the first retaining ring to axially seal the casing shroud segments.

7. The suspension arrangement of claim 6, wherein the turbine casing includes a further radial retaining ring groove positioned upstream of the casing shroud segments for retaining a second retaining ring, and the casing shroud segments position against upstream stator vane segments, the turbine casing and the second retaining ring.

8. The suspension arrangement of claim 7, and further comprising at least one sealing plate for positioning between the casing shroud segments and the first retaining ring to axially seal the casing shroud segments.

9. The suspension arrangement of claim 1, and further comprising an annular sealing element positioned in the retaining ring groove to seal between the retaining ring groove and the retaining ring.

10. The suspension arrangement of claim 9, wherein the turbine casing includes a further radial retaining ring groove positioned upstream of the casing shroud segments for retaining a second retaining ring, and the casing shroud segments position against upstream stator vane segments, the turbine casing and the second retaining ring.

11. The suspension arrangement of claim 10, and further comprising at least one sealing plate for positioning between the casing shroud segments and the first retaining ring to axially seal the casing shroud segments.

12. The suspension arrangement of claim 1, wherein the turbine casing includes a further radial retaining ring groove positioned upstream of the casing shroud segments for retaining a second retaining ring, and the casing shroud segments position against upstream stator vane segments, the turbine casing and the second retaining ring.

13. The suspension arrangement of claim 12, and further comprising at least one sealing plate for positioning between the casing shroud segments and the first retaining ring to axially seal the casing shroud segments.

14. A suspension arrangement for casing shroud segments of a high-pressure turbine of a jet engine having downstream inclination/gradation of rotor blade tips and casing shroud segments, comprising:
- a turbine casing including an axial retaining groove, a radial retaining ring groove and a plurality of circumferentially spaced assembly pockets axially opening the axial retaining ring groove;
- a plurality of casing shroud segments with downstream ends including circumferentially spaced apart attaching hooks having legs which extend axially in an upstream direction for engaging the axial retaining groove via corresponding ones of the assembly pockets;
- a first retaining ring for engaging the radial retaining ring groove to axially retain the attaching hooks in the axial retaining groove;
- an annular sealing element positioned in the retaining ring groove to seal between the retaining ring groove and the retaining ring.

15. A suspension arrangement for casing shroud segments of a high-pressure turbine of a jet engine having downstream inclination/gradation of rotor blade tips and casing shroud segments, comprising:
- a turbine casing including an axial retaining groove, a radial retaining ring groove and a plurality of circumferentially spaced assembly pockets axially opening the axial retaining ring groove;
- a plurality of casing shroud segments with downstream ends including circumferentially spaced apart attaching hooks having legs which extend axially in an upstream direction for engaging the axial retaining groove via corresponding ones of the assembly pockets;
- a first retaining ring for engaging the radial retaining ring groove to axially retain the attaching hooks in the axial retaining groove;
- wherein the turbine casing includes a further radial retaining ring groove positioned upstream of the casing shroud segments for retaining a second retaining ring, and the casing shroud segments position against upstream stator vane segments, the turbine casing and the second retaining ring.

16. A suspension arrangement for casing shroud segments of a high-pressure turbine of a jet engine having downstream inclination/gradation of rotor blade tips and casing shroud segments, comprising:
- a turbine casing including an axial retaining groove, a radial retaining ring groove and a plurality of circumferentially spaced assembly pockets axially opening the axial retaining ring groove;
- a plurality of casing shroud segments with downstream ends including circumferentially spaced apart attaching hooks having legs which extend axially in an upstream direction for engaging the axial retaining groove via corresponding ones of the assembly pockets;
- a first retaining ring for engaging the radial retaining ring groove to axially retain the attaching hooks in the axial retaining groove;
- at least one sealing plate for positioning between the casing shroud segments and the first retaining ring to axially seal the casing shroud segments.

* * * * *